US012691797B2

(12) United States Patent
Choi et al.

(10) Patent No.: US 12,691,797 B2
(45) Date of Patent: Jul. 28, 2026

(54) RECLINING DEVICE FOR VEHICLE SEAT

(71) Applicant: Hyundai Transys Inc., Seosan-si (KR)

(72) Inventors: Han Yun Choi, Hwaseong-si (KR);
Jong Su Kim, Hwaseong-si (KR);
Cheolhwan Yoon, Hwaseong-si (KR);
Sai Youn Jung, Hwaseong-si (KR);
Hwa Young Mun, Hwaseong-si (KR);
Gwon Hwa Bok, Hwaseong-si (KR);
Jae Yong Jang, Hwaseong-si (KR);
Junsik Hwang, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 314 days.

(21) Appl. No.: 18/521,645

(22) Filed: Nov. 28, 2023

(65) Prior Publication Data

US 2024/0190307 A1 Jun. 13, 2024

(30) Foreign Application Priority Data

Dec. 12, 2022 (KR) ......................... 10-2022-0172433

(51) Int. Cl.
B60N 2/22 (2006.01)
(52) U.S. Cl.
CPC ................................. B60N 2/2227 (2013.01)
(58) Field of Classification Search
CPC .... B60N 2/433; B60N 2/2227; B60N 2/4249;
B60N 2/938; B60N 2/2362; B60N
2/3004; B60N 2/3009; B60N 2/3011;
B60N 2/2352; B60N 2/366; B60N 2/2245
See application file for complete search history.

(56) References Cited

U.S. PATENT DOCUMENTS

| | | | | |
|---|---|---|---|---|
| 4,223,947 A | * | 9/1980 | Cremer ................ | B60N 2/2352 |
| | | | | 297/367 R |
| 4,591,207 A | * | 5/1986 | Nithammer .......... | B60N 2/2352 |
| | | | | 297/367 R |
| 6,598,938 B2 | * | 7/2003 | Boltze .................. | B60N 2/2352 |
| | | | | 297/378.12 |
| 8,783,775 B2 | * | 7/2014 | Kienke ................ | B60N 2/2352 |
| | | | | 297/367 R |
| 10,449,875 B2 | * | 10/2019 | Takiya .................. | B60N 2/2227 |
| 2011/0266852 A1 | | 11/2011 | Kienke et al. | |

FOREIGN PATENT DOCUMENTS

| | | | |
|---|---|---|---|
| DE | 10048127 B4 * | 5/2008 | ............... B60N 2/20 |
| EP | 3024690 A1 | 6/2016 | |
| JP | H09-206155 A | 8/1997 | |
| KR | 20110075032 A | 7/2011 | |
| KR | 10-2013-0049405 A | 5/2013 | |

OTHER PUBLICATIONS

Aurelien Petiaud, "Extended European Search Report for EP Application No. 23213223.3", Apr. 23, 2024, EPO, Germany.

* cited by examiner

*Primary Examiner* — Milton Nelson, Jr.
(74) *Attorney, Agent, or Firm* — Bridgeway IP Law Group, PLLC; Jihun Kim

(57) ABSTRACT

A reclining device for a vehicle seat includes a rotary bracket having a center portion rotatably connected to a first frame and having a first locking section and a second locking section connected to the first locking section, and a cam configured to rotate about a center portion connected to the first frame and having a locking portion provided at one end thereof and positioned in the first locking section or the second locking section so as to be locked.

10 Claims, 7 Drawing Sheets

RECLINING DEVICE FOR VEHICLE SEAT

CROSS-REFERENCE TO RELATED APPLICATIONS

This application claims priority to and the benefit of Korean Patent Application No. 10-2022-0172433 filed in the Korean Intellectual Property Office on Dec. 12, 2022, the entire contents of which are incorporated herein by reference.

TECHNICAL FIELD

The present invention relates to a reclining device for a vehicle seat.

BACKGROUND ART

In general, seats may be mounted in two or more rows in a van such as a recreational vehicle (RV) or a sports utility vehicle (SUV). The seat mounted in the van includes a seatback configured to support an upper body of a passenger, a seat cushion configured to support a lower body of the passenger, and a headrest configured to support an occipital region of the passenger.

In the case of a passenger vehicle, passengers may get in or out of seats in a first row through a front door, and passengers may get in or out of seats in a second row through a rear door. Passengers may get in or out of seats in a third row through the rear door. However, because the seats in the second row block an entrance/exit passageway toward the seats in the third row, the entrance/exit passageway toward the seats in the third row may be ensured by folding the seatback of the seat in the second row. The seatback of the seat in the second row in the van may be folded by a reclining device for a vehicle seat.

However, the reclining device for a vehicle seat in the related art has a problem in that the seatback is inadvertently folded as the seatback is unlocked when impact such as a vehicle collision occurs.

DOCUMENT OF RELATED ART

Patent Document (Patent Document 1) Korean Patent Application Laid-Open No. 10-2013-0049405 (published on May 14, 2013)

SUMMARY OF THE INVENTION

The present invention has been made in an effort to solve the above-mentioned problem, and an object of the present invention is to provide a reclining device for a vehicle seat, which is capable of allowing a cam to be locked in a second locking section even though the cam separates from a first locking section of a rotary bracket in the event of an impact, thereby preventing a seatback from being inadvertently folded.

In order to achieve the above-mentioned object, the present invention provides a reclining device for a vehicle seat, the reclining device including: a rotary bracket having a center portion rotatably connected to a first frame and having a first locking section and a second locking section connected to the first locking section; and a cam configured to rotate about a center portion connected to the first frame and having a locking portion provided at one end thereof and positioned in the first locking section or the second locking section so as to be locked, in which a second pressure angle at which the locking portion is locked in the second locking section is smaller than a first pressure angle at which the locking portion is locked in the first locking section.

The first and second pressure angles may be angles between a load of the rotary bracket applied toward the cam and a reaction force of the cam.

The first pressure angle may be 6 to 12 degrees, and the second pressure angle may be 0 to 5 degrees.

The load of the rotary bracket may be applied along a normal line that is a straight line perpendicular to a tangential line of the first and second locking sections, and the reaction force of the cam may be applied along a straight line that connects two locking points at which the center portion of the cam meets the tangential line and the normal line.

A disc may be coupled to a connection part between a second frame and the first frame connected to a seat cushion, and the rotary bracket may be provided inside the first frame and positioned between the disc and the cam.

The rotary bracket may include: an insertion protrusion configured to restrict a rotation of the disc by being inserted into an accommodation groove provided in the disc; and a release groove provided in the form of a recessed groove connected to the second locking section.

The rotary bracket may further include: a first support protrusion provided on one surface directed toward the first frame, formed at an interval from the center portion of the rotary bracket, and inserted into a first long hole of the first frame; and a second support protrusion provided on one surface directed toward the first frame, formed between the center portion of the rotary bracket and the first support protrusion, and inserted into a second long hole of the first frame.

The center portion of the rotary bracket may be rotatably connected to the first frame by means of a first hinge shaft, and the center portion of the cam and a center portion of a lever may be rotatably connected to the first frame by means of a second hinge shaft.

The lever may have an assembling hole, an assembling protrusion of the cam may be inserted into the assembling hole, and the assembling protrusion may be formed on one surface of the cam directed toward the lever.

When an external impact is applied to the disc, a rotational force of the disc may be transmitted to the cam through the rotary bracket, and the locking portion of the cam positioned in the first locking section may separate from the first locking section and engage with the locking point of the second locking section so as to be locked.

When a cable connected to the lever is pulled, the cam may rotate about the center portion of the cam in a release direction together with the lever, and the locking portion, which engages with the first locking section in a locking state, may pass over the second locking section and be inserted into the release groove, such that the insertion protrusion of the rotary bracket, which is inserted into the accommodation groove of the disc, separates from the accommodation groove, and at the same time, the second frame connected to a seatback rotates in a folding direction together with the disc, such that the seatback is folded.

According to the present invention, it is possible to allow the cam to be locked in the second locking section even though the cam separates from the first locking section of the rotary bracket in the event of an impact, thereby preventing the seatback from being inadvertently folded.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
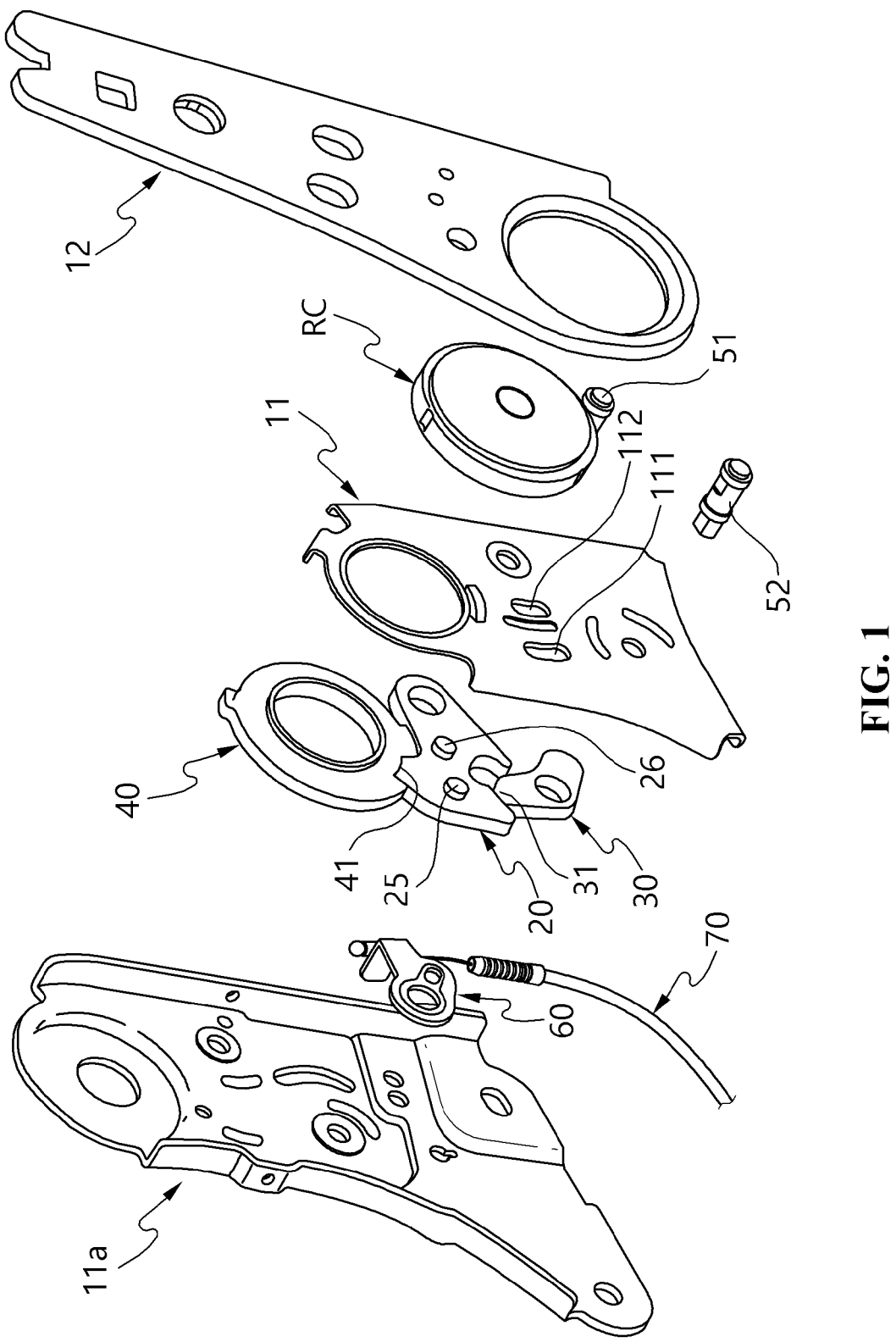
FIG. 1 is an exploded perspective view of a reclining device for a vehicle seat according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
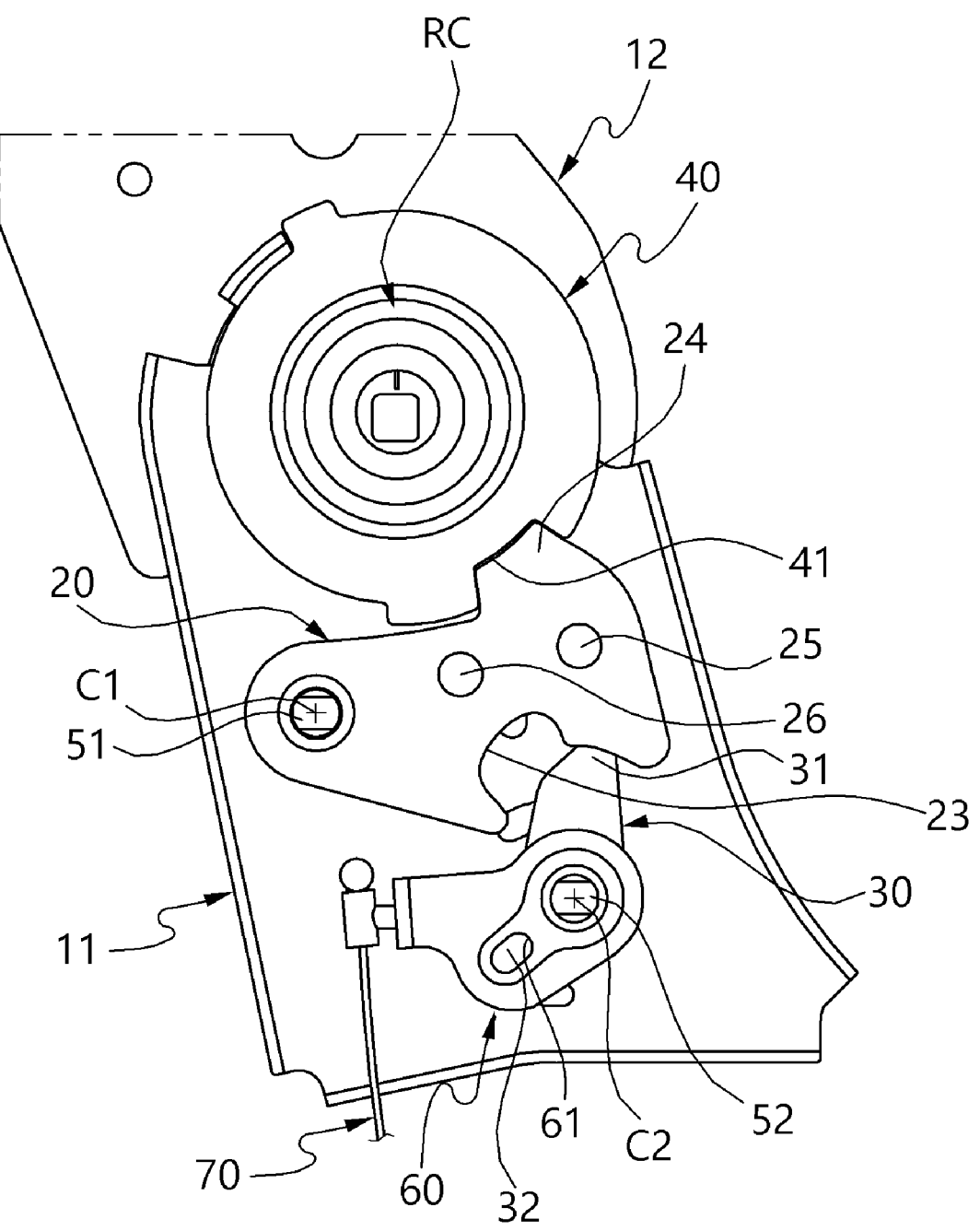
FIG. 2 is a view illustrating an assembled state of the reclining device for a vehicle seat according to the exemplary embodiment of the present invention.

FIG. 1 is an exploded perspective view of a reclining device for a vehicle seat according to an exemplary embodiment of the present invention, and FIG. 2 is a view illustrating an assembled state of the reclining device for a vehicle seat according to the exemplary embodiment of the present invention.

As illustrated in FIGS. 1 and 2, the present invention includes a rotary bracket 20 and a cam 30 having a double locking structure.

A center portion C1 of the rotary bracket 20 may be rotatably connected to an inner portion of a first frame 11. The first frame 11 may be connected to a seat cushion (a seat cushion frame, not illustrated) configured to support a lower body of a passenger.

The rotary bracket 20 may have first and second locking sections 21 and 22 for preventing folding of a seatback (seatback frame, not illustrated) and a release groove 23 for folding along an outer peripheral portion directed toward the cam 30.

For example, the first and second locking sections 21 and 22 and the release groove 23 are sequentially provided, thereby defining a continuous curved line.

The center portion C1 of the rotary bracket 20 is connected to the inner portion of the first frame 11, such that the rotary bracket 20 may rotate about the center portion C1. The center portion C1 of the rotary bracket 20 may be rotatably connected to the first frame 11 by means of a first hinge shaft 51.

A center portion C2 of the cam 30 is connected to the inner portion of the first frame 11, such that the cam 30 may rotate about the center portion C2. The center portion C2 of the cam 30 may be rotatably connected to the first frame 11 by means of a second hinge shaft 52.

The cam 30 may have a locking portion 31 provided at one end directed toward the rotary bracket 20. The locking portion 31 may be positioned in a first locking section 21 or a second locking section 22 so as to be locked. When the locking portion 31 is inserted into the release groove 23 of the rotary bracket 20, the seatback may be folded.

As illustrated in FIG. 2, a disc 40 may be coupled to a connection part between a second frame 12 and the first frame 11 connected to the seat cushion (not illustrated). The second frame 12 may be connected to the seatback (not illustrated) configured to support an upper body of the passenger.

The rotary bracket 20 may be provided inside the first frame 11 and positioned between the disc 40 and the cam 30.

The rotary bracket 20 includes an insertion protrusion 24, the release groove 23, a first support protrusion 25, and a second support protrusion 26.

The insertion protrusion 24 may be inserted into an accommodation groove 41 provided in an outer-diameter portion of the disc 40 and restrict a rotation of the disc 40.

When the insertion protrusion 24 of the rotary bracket 20 is inserted into the accommodation groove 41 of the disc 40, the rotation of the disc 40 may be restricted, and the unfolded state of the seatback may be maintained.

When the insertion protrusion 24 of the rotary bracket 20 separates from the accommodation groove 41 of the disc 40, the disc 40 rotates in a folding direction, such that the seatback may be folded.

The release groove 23 may be provided in the form of a recessed groove connected to the second locking section 22.

When the locking portion 31 of the cam 30 is inserted into the release groove 23, the insertion protrusion 24 of the rotary bracket 20 separates from the accommodation groove 41 of the disc 40, such that the seatback method folded.

The first support protrusion 25 may be inserted and coupled into a first long hole 111 of the first frame 11. The first support protrusion 25 may move within a range of the first long hole 111.

The first support protrusion 25 may protrude toward the first frame 11 from one surface directed toward the first frame 11. The first support protrusion 25 may be formed at an interval from the center portion C1 of the rotary bracket 20.

The second support protrusion 26 may be inserted and coupled into a second long hole 112 of the first frame 11. The second support protrusion 26 may move within a range of the second long hole 112.

The second support protrusion 26 may protrude toward the first frame 11 from one surface directed toward the first frame 11. The second support protrusion 26 may be formed between the center portion C1 and the first support protrusion 25 of the rotary bracket 20.

The strength of the rotary bracket 20 may be significantly improved by the center portion C1, the first support protrusion 25, and the second support protrusion 26. Even though a concentrated load is applied to the rotary bracket 20, the load may be dispersed through the center portion C1, the first support protrusion 25, and the second support protrusion 26.

The cam 30 may have an assembling protrusion 32. The assembling protrusion 32 may protrude toward a lever 60 from one surface directed toward the lever 60.

The assembling protrusion 32 of the cam 30 may be inserted into an assembling hole 61 of the lever 60. In a state in which the assembling protrusion 32 of the cam 30 is inserted into the assembling hole 61 of the lever 60, the center portion of the cam 30 and the center portion of the lever 60 may be rotatably connected to the first frame 11 by means of the second hinge shaft 52.

The lever 60 may be connected to a cable 70. When the cable 70 is pulled, the lever 60 connected to the cable 70 may be rotated, and the cam 30 having the assembling protrusion 32 inserted into the assembling hole 61 of the lever 60 may rotate about the center portion C2 in conjunction with the rotation of the lever 60.

A cover 11a may be coupled to one side of the first frame 11 so as to cover one open side of the first frame 11 in a state in which the disc 40, the rotary bracket 20, the cam 30, and the lever 60 are coupled to the inner portion of the first frame 11.

A recliner RC capable of adjusting an angle of the seatback may be mounted on the second frame 12.

Figure 3:
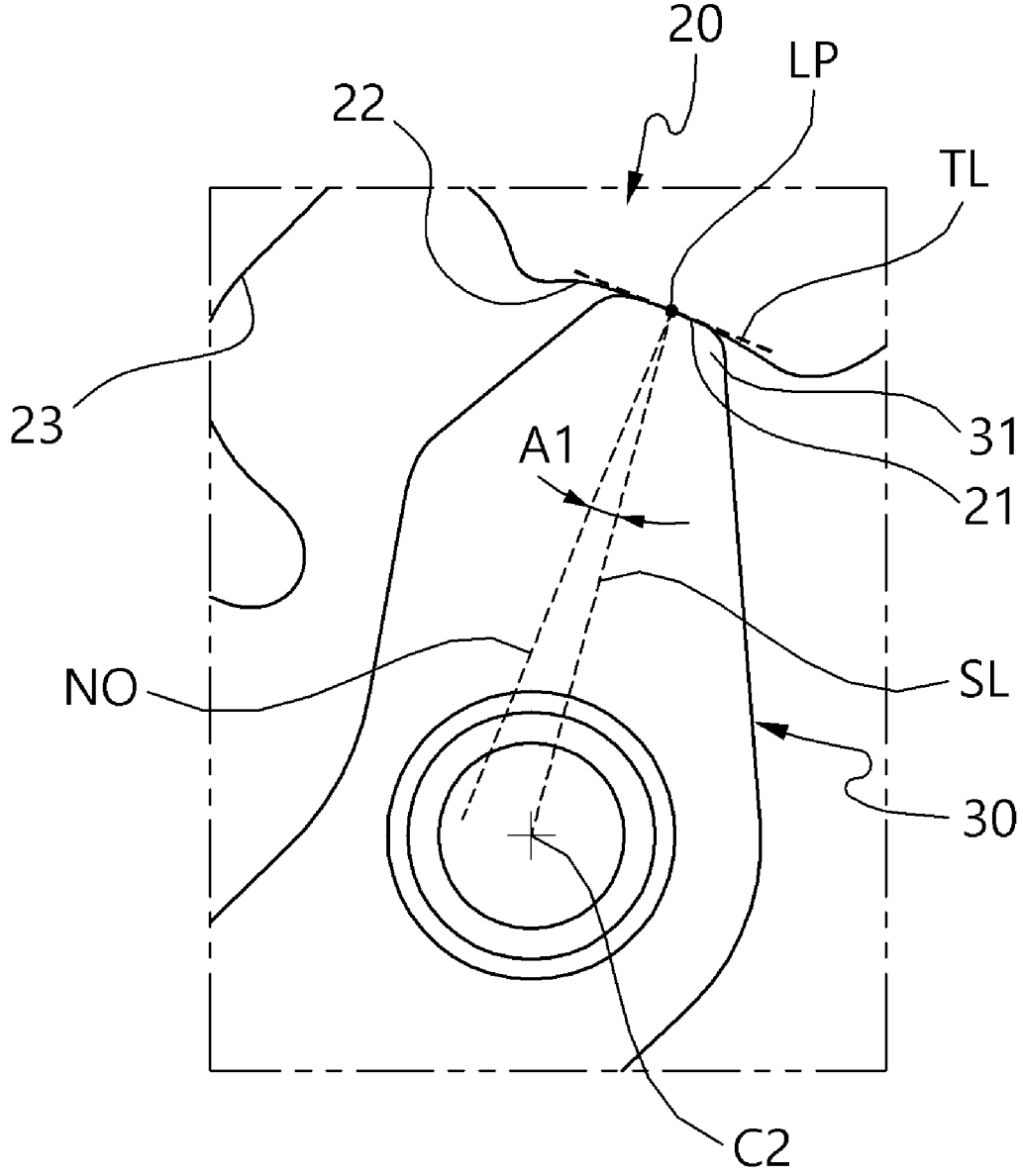
FIG. 3 is a view illustrating a state in which a cam according to the exemplary embodiment of the present invention is locked in a first locking section.
Figure 4:
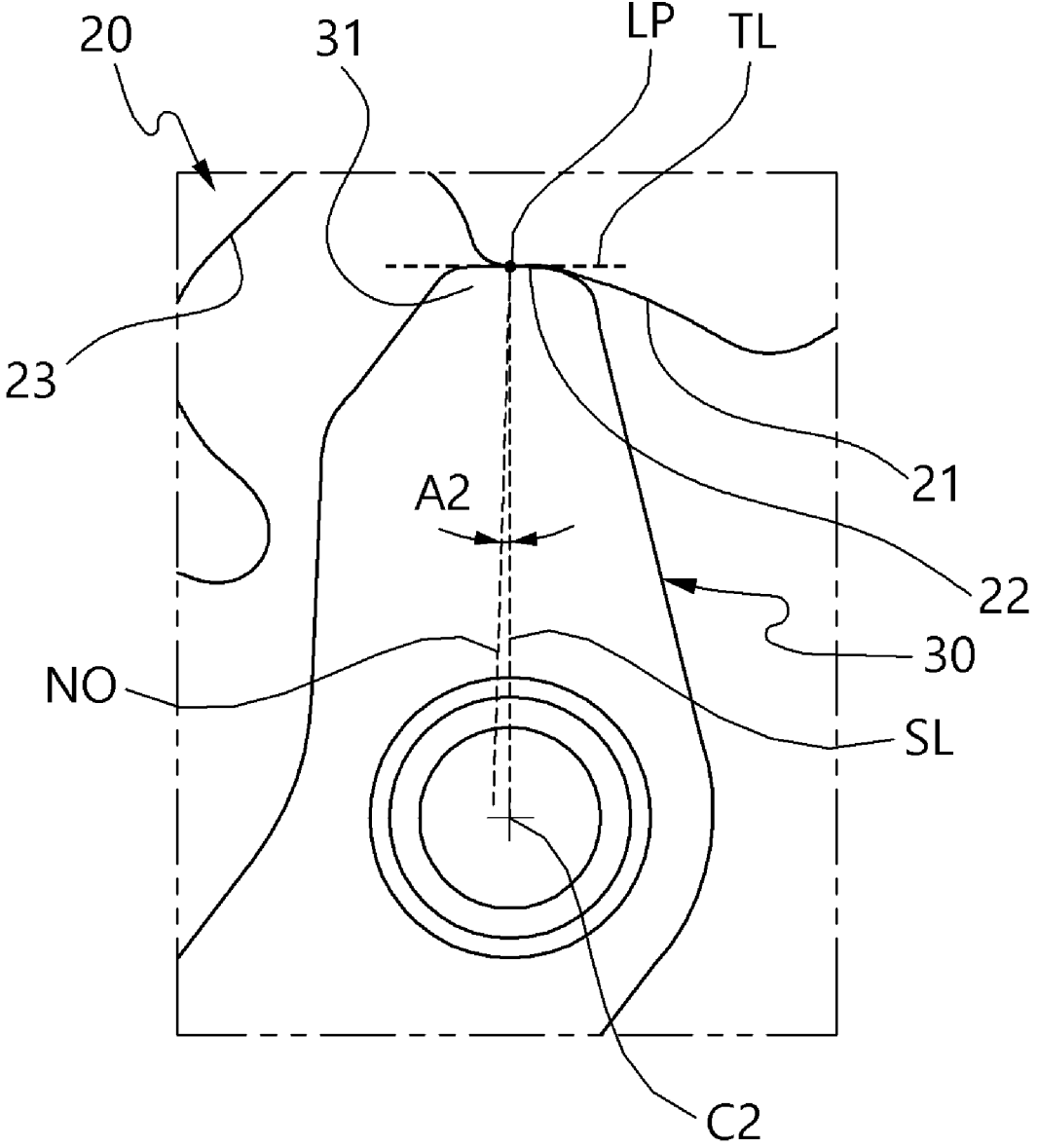
FIG. 4 is a view illustrating a state in which the cam according to the exemplary embodiment of the present invention is locked in a second locking section.

FIG. 3 is a view illustrating a state in which the cam according to the exemplary embodiment of the present invention is locked in the first locking section, and FIG. 4 is a view illustrating a state in which the cam according to the exemplary embodiment of the present invention is locked in the second locking section.

As illustrated in FIGS. 3 and 4, a pressure angle may be provided so that a second pressure angle A2 at which the locking portion 31 of the cam 30 is locked in the second locking section 22 of the rotary bracket 20 is smaller than a first pressure angle A1 at which the locking portion 31 of the cam 30 is locked in the first locking section 21 of the rotary bracket 20.

The first and second pressure angles A1 and A2 may be angles between a load of the rotary bracket 20 applied toward the cam 30 direction and a reaction force of the cam 30 applied toward the rotary bracket 20.

The load of the rotary bracket 20 may be applied along a normal line NO that is a straight line perpendicular to a tangential line TL of the first and second locking sections 21 and 22. The reaction force of the cam 30 may be applied along a straight line SL that connects two locking points LP at which the normal line NO meets the tangential line TL and the center portion C2 of the cam 30.

For example, when the locking portion 31 of the cam 30 is locked in the first locking section 21 of the rotary bracket 20, the first pressure angle A1 may be 6 to 12 degrees. When the locking portion 31 of the cam 30 is locked in the second locking section 22 of the rotary bracket 20, the second pressure angle A2 may be 0 to 5 degrees.

Next, a locking process according to the present invention in the event of an impact such as a vehicle collision will be described.

As illustrated in FIGS. 2 to 4, a load may be applied to the seatback in the event of an impact such as a vehicle collision. The load of the seatback may be transmitted to the disc 40. The disc 40 may press the rotary bracket 20 while being rotated by the load of the seatback.

The rotary bracket 20 may press the cam 30 by being rotated about the center portion C1 by being pressed by the disc 40.

As illustrated in FIGS. 3 and 4, the locking portion 31 of the cam 30, which has been positioned in the first locking section 21 of the rotary bracket 20, may separate from the first locking section 21 and move to the second locking section 22.

Because a pressing force of the rotary bracket 20 applied to the cam 30 is higher than a force for locking the locking portion 31 in the first locking section 21, the locking portion 31 may separate from the first locking section 21 and move to the second locking section.

The locking portion 31 of the cam 30 may engage with the locking point LP in the second locking section 22. Because the force for locking the locking portion 31 in the second locking section 22 is higher than an external impact, the state in which the locking portion 31 is locked in the second locking section 22 may be maintained.

Because the second pressure angle A2 of the second locking section 22 is smaller than the first pressure angle A1 of the first locking section 21, a strongly locked state in which the seatback cannot be folded may be implemented.

In the state in which the locking portion 31 of the cam 30 is locked in the second locking section 22 of the rotary bracket 20, the load of the second locking section 22 may be applied to the locking portion 31, and the reaction force of the locking portion 31 may be applied to the second locking section 22.

Next, a folding process according to the present invention in the event of an emergency escape will be described.

Figure 5:
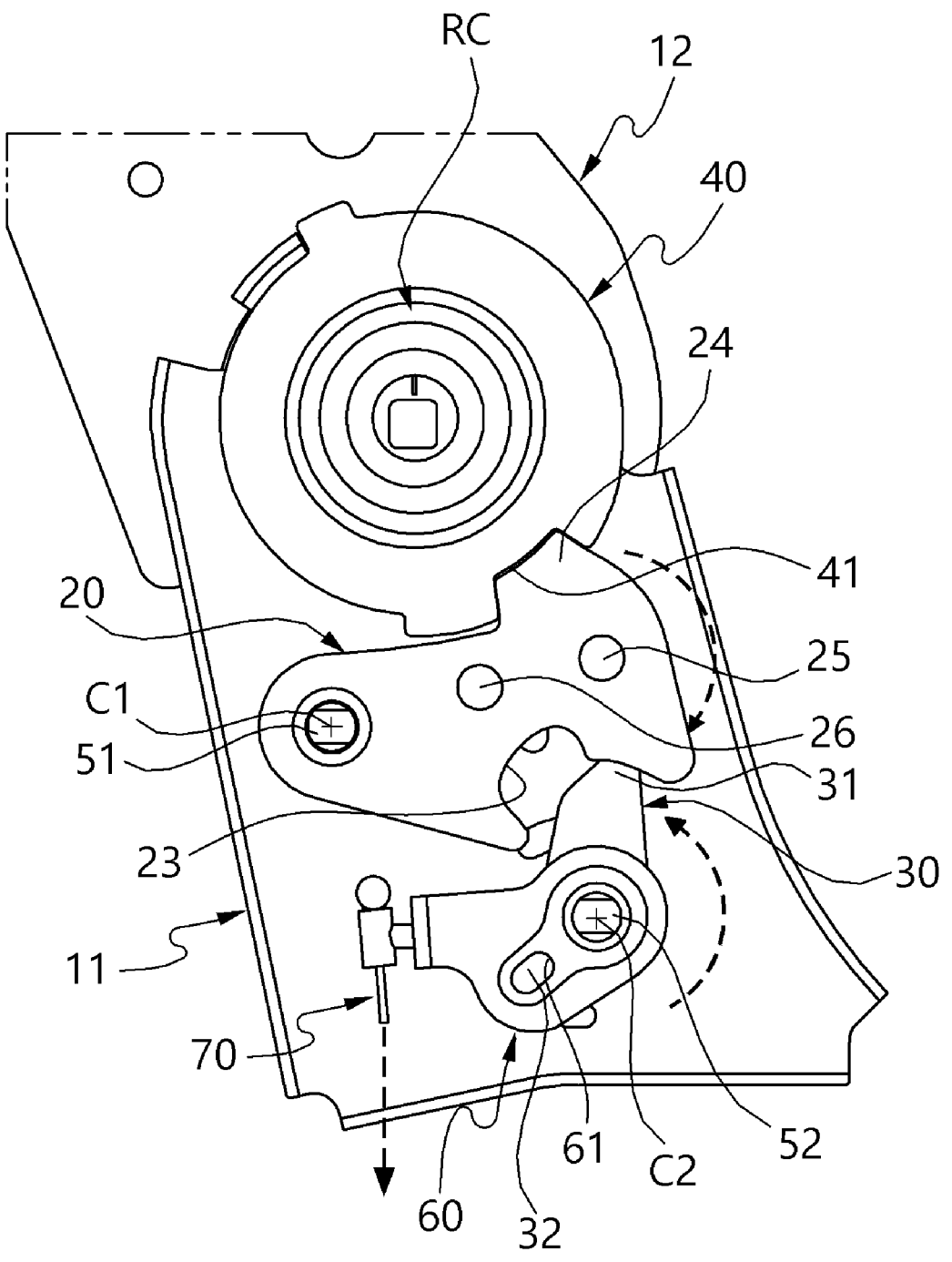
FIG. 5 is a view illustrating an operation of folding the reclining device for a vehicle seat according to the exemplary embodiment of the present invention.
Figure 6:
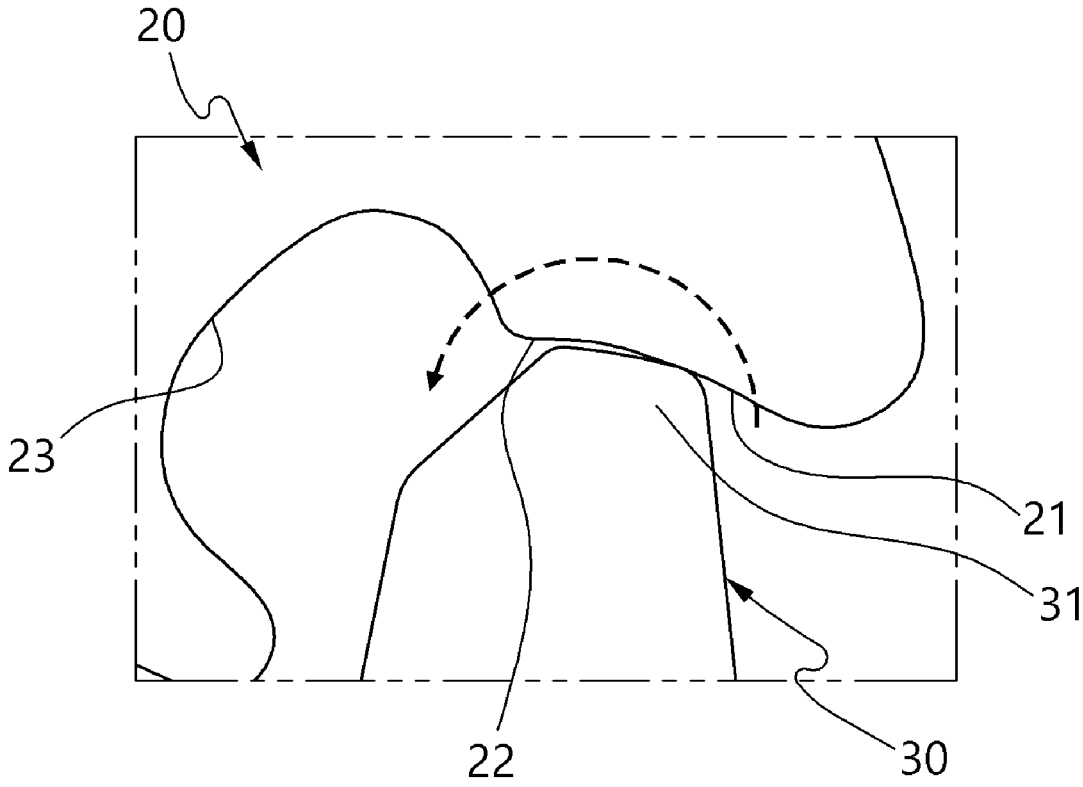
FIG. 6 is a view illustrating a process in which the cam moves to the first locking section when the reclining device for a vehicle seat according to the exemplary embodiment of the present invention is folded.
Figure 7:
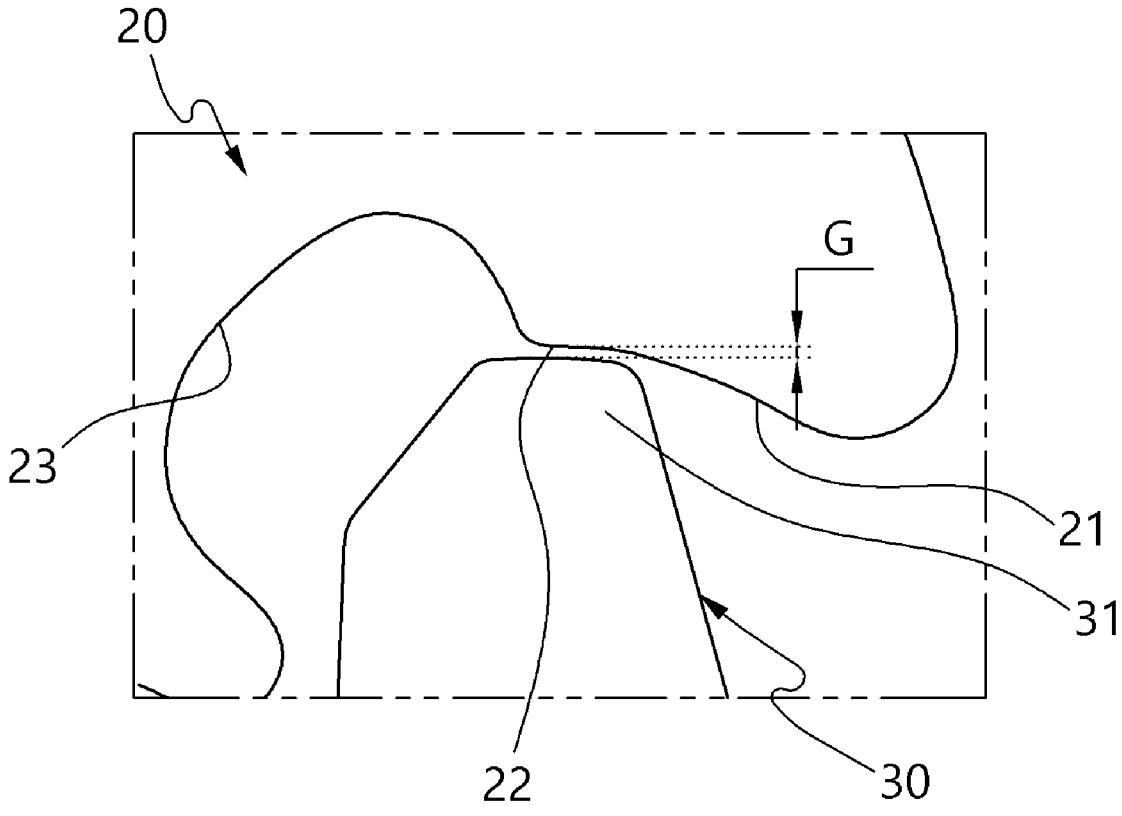
FIG. 7 is a view illustrating a process in which the cam passes over the second locking section and moves to a release groove when the reclining device for a vehicle seat according to the exemplary embodiment of the present invention is folded.

FIG. 5 is a view illustrating an operation of folding the reclining device for a vehicle seat according to the exemplary embodiment of the present invention, FIG. 6 is a view illustrating a process in which the cam moves to the first locking section when the reclining device for a vehicle seat according to the exemplary embodiment of the present invention is folded, and FIG. 7 is a view illustrating a process in which the cam passes over the second locking section and moves to the release groove when the reclining device for a vehicle seat according to the exemplary embodiment of the present invention is folded.

As illustrated in FIGS. 5 to 7, when the cable 70 is pulled in an emergency escape situation in which the seatback is required to be folded, the lever 60 connected to the cable 70 may rotate in the folding direction about the center portion.

As the lever 60 rotates, the cam 30 connected to the lever 60 may rotate in the folding direction about the center portion C2.

As the cam 30 rotates, the locking portion 31 of the cam 30 may pass over the second locking section 22 from the first locking section 21 of the rotary bracket 20 and be inserted into the release groove 23 of the rotary bracket 20.

Because a force for pulling the cable 70 is higher than a force for locking the locking portion 31 in the first locking section 21, the locking portion 31 may pass over the second locking section 22 from the first locking section 21 and be inserted into the release groove 23.

A gap G is present between the locking portion 31 and the second locking section 22 when the locking portion 31 passes over the second locking section 22, such that the locking portion 31 may freely pass over the second locking section 22 without being locked in the second locking section 22.

For example, in case that an impact such as a vehicle collision is transmitted to the rotary bracket 20, a pressing force of the rotary bracket 20 is applied toward the cam 30. Therefore, the gap G between the locking portion 31 of the cam 30 and the second locking section 22 of the rotary bracket 20 may disappear.

Because the force for supporting the rotary bracket 20 disappears in a moment when the locking portion 31 of the cam 30, which supports the rotary bracket 20 in the first locking section 21, is inserted into the release groove 23 of the rotary bracket 20, the rotary bracket 20 may rotate in the folding direction about the center portion C1.

As the rotary bracket 20 rotates in the folding direction, the insertion protrusion 24 of the rotary bracket 20 may separate from the accommodation groove 41 of the disc 40.

The disc 40 may rotate in the folding direction as the insertion protrusion 24 of the rotary bracket 20, which has restricted the rotation of the disc 40, separates from the accommodation groove 41 of the disc 40.

As the disc 40 rotates in the folding direction as described above, the second frame 12 connected to the disc 40 may rotate in the folding direction. Therefore, the seatback connected to the second frame 12 may be folded.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A reclining device for a vehicle seat, the reclining device comprising:

a rotary bracket having a center portion thereof rotatably connected to a first frame and having a first locking section and a second locking section connected to the first locking section; and a cam configured to rotate about a center portion thereof which is connected to the first frame and having a locking portion disposed at one end thereof and disposed in the first locking section or the second locking section to be locked, wherein a second pressure angle at which the locking portion is locked in the second locking section is smaller than a first pressure angle at which the locking portion is locked in the first locking section, and wherein the rotary bracket further comprises:

a first support protrusion disposed on one surface of the rotary bracket, directed toward the first frame, defined at an interval from the center portion of the rotary bracket, and configured to be inserted into a first long hole of the first frame; and a second support protrusion disposed on the one surface of the rotary bracket, directed toward the first frame, defined between the center portion of the rotary bracket and the first support protrusion, and configured to be inserted into a second long hole of the first frame.

2. The reclining device of claim 1, wherein the first pressure angle is in a range of 6 to 12 degrees, and the second pressure angle is in a range of 0 to 5 degrees.

3. The reclining device of claim 1, wherein the first and second pressure angles are angles between a direction of a load of the rotary bracket applied toward the cam and a direction of a reaction force of the cam.

4. The reclining device of claim 3, wherein the load of the rotary bracket is applied along a normal line that is perpendicular to a tangential line of the first and second locking sections, and the reaction force of the cam is applied along a straight line that connects two locking points at which the center portion of the cam meets the tangential line and the normal line.

5. The reclining device of claim 4, wherein a disc is coupled to a connection part between a second frame and the first frame connected to a seat cushion, and the rotary bracket is disposed inside the first frame and positioned between the disc and the cam.

6. The reclining device of claim 5, wherein when an external impact is applied to the disc, a rotational force of the disc is transmitted to the cam through the rotary bracket, and the locking portion of the cam disposed in the first locking section separates from the first locking section and engages with a locking point of the second locking section to be locked.

7. The reclining device of claim 5, wherein the rotary bracket comprises:

an insertion protrusion configured to restrict a rotation of the disc by being inserted into an accommodation groove defined in the disc; and a release groove defined as a recessed groove connected to the second locking section.

8. The reclining device of claim 7, wherein the center portion of the rotary bracket is rotatably connected to the first frame by a first hinge shaft, and the center portion of the cam and a center portion of a lever are rotatably connected to the first frame by a second hinge shaft.

9. The reclining device of claim 8, wherein the lever has an assembling hole, an assembling protrusion of the cam is configured to be inserted into the assembling hole, and the assembling protrusion is defined on one surface of the cam directed toward the lever.

10. The reclining device of claim 8, wherein when a cable connected to the lever is pulled, the cam rotates about the center portion of the cam in a release direction together with the lever, and the locking portion, which engages with the first locking section in a locking state, passes over the second locking section and is inserted into the release groove, such that the insertion protrusion of the rotary bracket, which is inserted into the accommodation groove of the disc, separates from the accommodation groove, while the second frame connected to a seatback rotates in a folding direction together with the disc, and the seatback is folded.

\* \* \* \* \*